(12) United States Patent
Nguyen et al.

(10) Patent No.: US 10,760,410 B2
(45) Date of Patent: Sep. 1, 2020

(54) STITCHING METHODS TO ENHANCE BEAMFORMING RESULTS

(71) Applicant: Halliburton Energy Services, Inc., Houston, TX (US)

(72) Inventors: Nam Nguyen, Singapore (SG); Yi Yang Ang, Singapore (SG); Yinghui Lu, The Woodlands, TX (US); Avinash Vinayak Taware, San Jose, CA (US); Paris Smaragdis, Urbana, IL (US); David Alan Welsh, League City, TX (US); Nugroho Perhatianto, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 119 days.

(21) Appl. No.: 15/759,436

(22) PCT Filed: Oct. 8, 2015

(86) PCT No.: PCT/US2015/054717
§ 371 (c)(1),
(2) Date: Mar. 12, 2018

(87) PCT Pub. No.: WO2017/062015
PCT Pub. Date: Apr. 13, 2017

(65) Prior Publication Data
US 2018/0258756 A1    Sep. 13, 2018

(51) Int. Cl.
*G01V 1/46* (2006.01)
*G01V 1/48* (2006.01)
(Continued)

(52) U.S. Cl.
CPC ........ *E21B 47/107* (2020.05); *G01S 7/52065* (2013.01); *G01V 1/40* (2013.01);
(Continued)

(58) Field of Classification Search
CPC ... G01V 1/40; G01V 1/48; G01V 1/46; G01S 7/52065; G06T 3/4038; E21B 47/101; G10K 11/346
(Continued)

(56) References Cited

U.S. PATENT DOCUMENTS

2010/0268489 A1    10/2010   Lie et al.
2013/0114376 A1    5/2013    Aeron et al.
(Continued)

FOREIGN PATENT DOCUMENTS

WO    2010078577 A2    7/2010

OTHER PUBLICATIONS

"International Application Serial No. PCT/US2015/054717, International Search Report dated Jun. 29, 2016", 3 pages.
(Continued)

*Primary Examiner* — Daniel L Murphy
(74) *Attorney, Agent, or Firm* — Gilliam IP PLLC

(57) ABSTRACT

Various apparatus or methods are arranged to operate a tool in a wellbore, where the tool has a number of acoustic sensors. Scanning images obtained by the tool sensors along the borehole can be combined to increase the contrast of leak location with respect to background noise. A sequence of beamformed images, generated from signals captured by the tool as it moves over a range of depths of the wellbore, can be acquired. Each beamformed image may overlap at least one other beamformed image of the sequence. The beamformed images can be processed and the processed beamformed images can be combined, forming a stitched image. Additional apparatus, systems, and methods operable in providing stitched images can operate in a variety of applications.

17 Claims, 14 Drawing Sheets

(51) Int. Cl.
*E21B 47/107* (2012.01)
*G10K 11/34* (2006.01)
*G01S 7/52* (2006.01)
*G01V 1/40* (2006.01)
*G06T 3/40* (2006.01)

(52) U.S. Cl.
CPC .................. *G01V 1/46* (2013.01); *G01V 1/48* (2013.01); *G06T 3/4038* (2013.01); *G10K 11/346* (2013.01)

(58) Field of Classification Search
USPC .......................................................... 367/25
See application file for complete search history.

(56) References Cited

U.S. PATENT DOCUMENTS

| | | | |
|---|---|---|---|
| 2013/0286778 A1* | 10/2013 | Kisner | .................. G01N 29/00 367/35 |
| 2014/0036628 A1 | 2/2014 | Hill et al. | |
| 2015/0247751 A1 | 9/2015 | Kutlik et al. | |

OTHER PUBLICATIONS

"International Application Serial No. PCT/US2015/054717, Written Opinion dated Jun. 29, 2016", 6 pages.

* cited by examiner

US 10,760,410 B2

STITCHING METHODS TO ENHANCE BEAMFORMING RESULTS

TECHNICAL FIELD

The present invention relates generally to apparatus and methods of making and/or evaluating measurements related to oil and gas exploration.

BACKGROUND

Well integrity is becoming a key area of focus for most well operators during the entire well life cycle. To ensure safe operation of oil and gas wells and to avoid blow-out incidents or leakage of hydrocarbons to the environment, the integrity of the well downhole structure (tubing, casing, packers, barriers, and other structures) is of utmost importance. Recent mishaps/events in oil and gas industry stress the importance of well integrity evaluation and maintenance, where leak detection, isolation, and quantification form a major part. Hence, reliable leak detection and remediation/mitigation is important to avoid its adverse effects on the environment.

DETAILED DESCRIPTION

Figure 1:
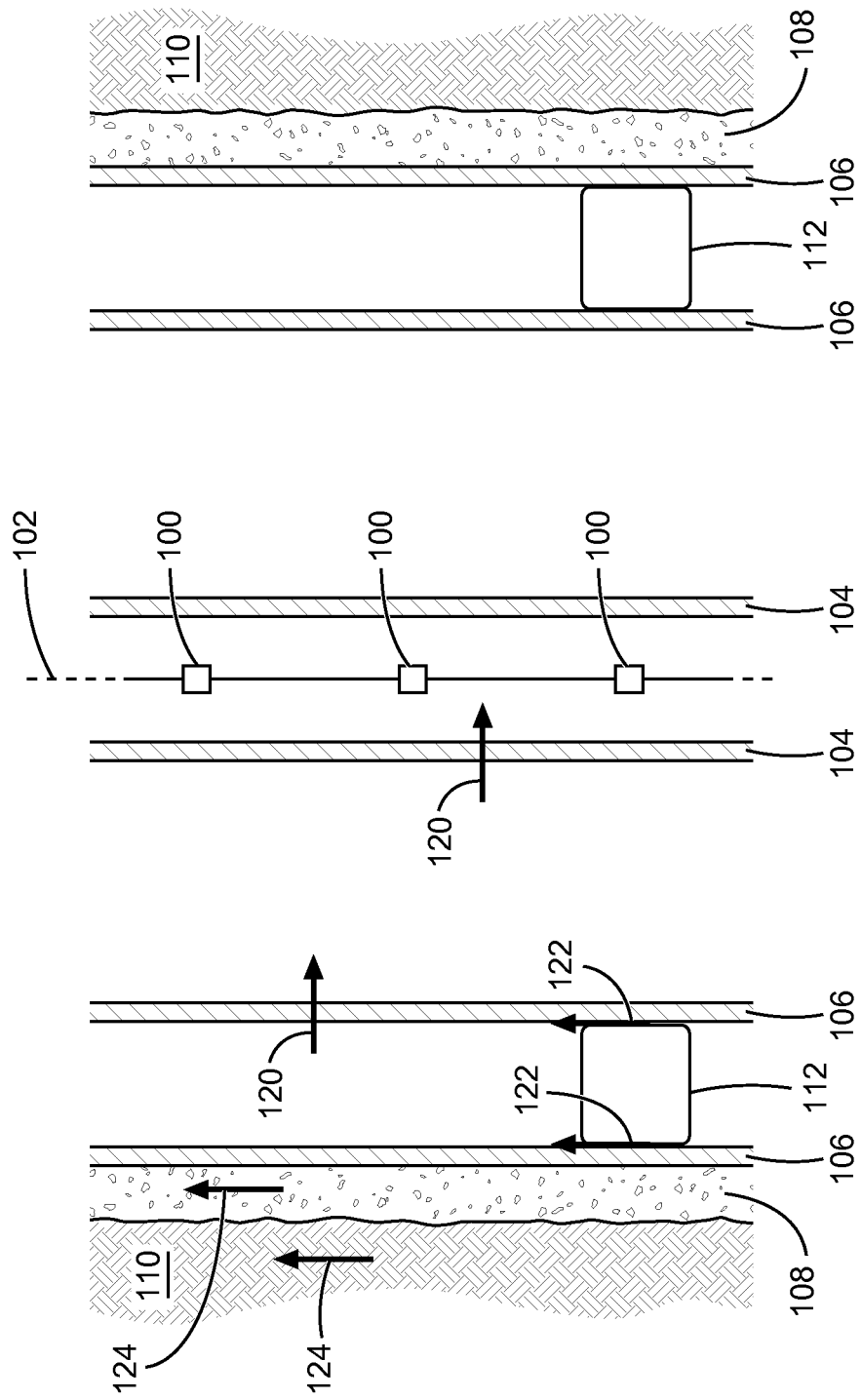
FIG. 1 is a schematic representation of an example acoustic-sensor array deployed within a wellbore, in accordance with various embodiments.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, a leak detection tool that may be realized essentially as an array of acoustic sensors is operated in a well and signals from these acoustic sensors can be processed and subjected to a post-processing technique to enhance the quality of leak detection results. This enhancement can be obtained by taking advantage of movements of the leak detection tool passing the leak location in the well. In particular, such techniques provide a framework to combine scanning images obtained by the tool sensors along the oil well in order to increase contrast of the leak location with respect to background noise.

A system and method to detect and estimate the locations of leaks inside an oil well can be implemented using an array of acoustic sensors. The array of acoustic sensors may be an array of hydrophones. Such acoustic sensors can be in tools, systems, and methods to detect one or more underground acoustic sources and to localize them in depth and radial distance from a wellbore. In an example, an array of at least three acoustic sensors may be disposed in the wellbore can be used in conjunction with array signal processing. The term "depth" herein generally refers to a coordinate along the direction of a borehole, regardless whether the borehole extends vertically into the formation or is tilted with respect to the vertical direction, unless otherwise indicated. The term "radial distance" refers to a direction perpendicular to and away from the longitudinal wellbore axis. Acoustic-source detection and localization as taught herein may be employed, in particular, to find underground fluid flows, for example, resulting from leaks in well barriers, from which the acoustic signals emanate.

Array signal processing generally refers to techniques for estimating or calculating parameters of one or more signal sources, such as the source locations and emitted waveforms, by fusing data collected by an array of sensors with known geometric relations either substantially simultaneously or, more generally, with known temporal relations between the different sensor signals. "Substantially simultaneously" herein indicates that the time intervals over which signals are collected overlap significantly, for example, by at least 90% between the different sensors. The collected overlap can be at least 99% between the different sensors. Array-signal-processing techniques can include various spatial filtering methods, such as but not limited to conventional beamforming, Capon beamforming, multiple signal classification (MUSIC), and various parametric methods, as well as time-delay estimation.

Array signal processing generally relies on a forward model of wave propagation from the source(s) to the sensors to solve the inverse problem, for example, source localization. In traditional application contexts, such as radar and sonar, this forward model is generally straightforward because wave propagation occurs in a homogenous and isotropic medium and the source can be assumed, as a practical matter, to be far away from the sensors. A homogenous and isotropic medium can be referred to as a uniform medium. Air and water are examples of uniform mediums. When fluid flows in and surrounding a wellbore are to be measured, however, the uniform medium and far-field assumptions break down. Accordingly, in various embodiments, the forward model can be adjusted to account for the configuration and condition of the wellbore and surrounding formation, which collectively include various propagation media and boundaries therebetween, and their effect on the wave field, as well as to facilitate the processing of near-field signals. Such effects on the wave field can include wave refractions, reflections, and resonances. Near-field signals are signals originating from a source whose distance from the sensors is not significantly (for example, orders of magnitude) larger than the spatial extent of the sensor array.

Implementing array signal processing can involve fusing the signals received by the individual sensors of the array of a tool for a plurality of inferred source locations within a predefined two-dimensional region to compute a two-dimensional map or image of an acoustic-source energy level, amplitude, or other fused-signal parameter as a function of depth and radial distance. The predefined two-dimensional region can span a certain length in the depth direction and can extend to a certain radial distance from the tool. The actual source location(s) can be determined from this map by identifying the local maximum, or multiple local maxima, of the acoustic source energy level or other parameter. The magnitude of the local maximum can be used to infer whether the identified acoustic source indeed corresponds to an underground flow. For instance, in some embodiments, acoustic signals are acquired under multiple flow and non-flow conditions to establish a statistical detection threshold for flows for use in a binary-hypothesis test or similar statistical test.

FIG. 1 is a schematic representation of an embodiment of an example acoustic-sensor array deployed within a wellbore. Sensors 100 may be arranged linearly along the longitudinal axis 102 of the wellbore, where the longitudinal axis 102 has a radial coordinate equal to zero. The sensors 100 may be uniformly spaced (as shown), or may have varying spacings between adjacent sensors. The sensor environment generally includes multiple physical barriers to fluid flow, such as a production tubing 104 through which oil or gas may be pumped up and out of the well, one or optionally multiple nested well casings 106, and a cement sheath 108 filling the space between the casing(s) 106 and the formation 110 surrounding the wellbore. Additionally, the wellbore may be divided into multiple vertical sections, for example, by packers 112 between the casings 106 that may separate, for example, a lower, perforated portion of the tubing where hydrocarbons enter from an upper, non-perforated portion serving as an upward conduit. Unintended flow scenarios that can occur in such a configuration include, for example, flows across the casing 106 or tubing 104 due to cracks or holes therein (indicated by arrows 120), flows past a packer 112 between adjacent vertical wellbore sections due to insufficient sealing (indicated by arrows 122), and flows within the formation 110, cement sheath 108, or other layer more or less parallel to the layer boundaries (indicated by arrows 124). As these flows pass through restricted paths, acoustic signals can be generated as a result of the accompanying pressure drops. The acoustic signals propagate generally in all directions through the formation and/or borehole, eventually being detected at various sensor locations.

Acoustic sensors suitable for use as sensors 100 can include, but are not limited to, hydrophones such as piezo-electric hydrophones, fiber Bragg grating (FBG) sensors, or segments of a distributed fiber-optic cable. In various embodiments, the acoustic sensors 100 are omnidirectional, i.e., unable to discriminate by themselves between different incoming directions of the signal. By exploiting the spatiotemporal relations between the signals received from the same source at multiple sensors, however, information about the signal direction and/or source location can be obtained. For example, by using at least three sensors in a linear arrangement along the wellbore axis, as shown in FIG. 1, it is possible, at least under certain conditions, to determine the depth and radial distance of the source. To further localize the source in the azimuthal direction, the configuration of the sensor array may be modified, e.g., by placing different sensors at different radial positions or otherwise arrange them two- or three-dimensionally, by partially shielding sensors to limit their detection to certain azimuthal windows, which can be implemented with different windows for different sensors, or by using directional sensors, that is, sensors that inherently provide directional information. As a practical matter, a linear configuration as shown in FIG. 1 may be the consequence of the spatial confines imposed by the tubing 104 in which the sensors are mounted.

Figure 2:
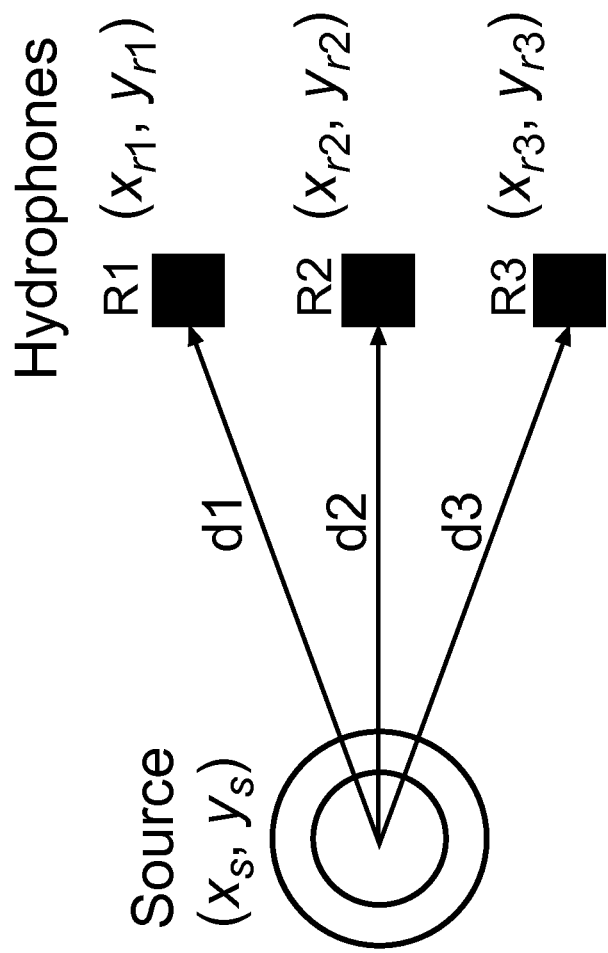
FIG. 2 is a representation of an acoustic source to be located in two dimensions based on signals received simultaneously at three or more sensor locations, in accordance with various embodiments.

FIG. 2 is a representation of an acoustic source to be located in two dimensions, for example by radial distance x and depth y, based on signals received simultaneously at three or more sensor locations R1, R2, R3. Such locating of the acoustic source may be based on the medium being uniform such that the signals travel from the source to the sensors along straight lines and at a known, constant speed of sound v. Travel along straight lines may be attributed to travel without undergoing refraction or reflection, for example. In this case, the travel time t of the signal from the source to a sensor is simply the ratio of the distance d between source and sensor to the speed of sound v. The absolute travel time t cannot be measured in the passive flow-detection methods described herein because the acoustic signal does not have a known starting point in time, as the flow typically commences long before the measurements take place and, in any case, at an unknown time. However, the time delay $t_i - t_j$ between the receipt of a certain signal feature at a sensor i and receipt of the same feature at a sensor j can in principle be determined. The certain signal feature may be a peak in the temporal wave form and the receipt of the same feature may be the relative phase shift with respect to sensor i and sensor j. With known sensor locations and a known speed of sound v, this time delay yields a nonlinear equation containing two unknowns, namely the coordinates $(x_s, y_s)$ of the source. The following equations may be used $$t_i = \frac{d_i}{v} = \frac{\sqrt{(X_s - x_{ri})^2 + (y_s - y_{ri})^2}}{v}$$

$$\Delta t_{ij} = t_i - t_j = \frac{\sqrt{(x_s - x_{ri})^2 + (y_s - y_{ri})^2} - \sqrt{(x_s - x_{rj})^2 + (y_s - y_{rj})^2}}{v}$$

A second time delay measured between one of the sensors i,j and the third sensor k provides a second, independent nonlinear equation. From these two equations, the two-dimensional source location can be calculated straightforwardly in a manner known to those of ordinary skill in the art. If the speed of sound v is unknown and/or changes as the signal propagates through different media, an array with a larger number of sensors (e.g., four or more sensors) may be used to provide sufficient information to localize the source.

Figure 3:
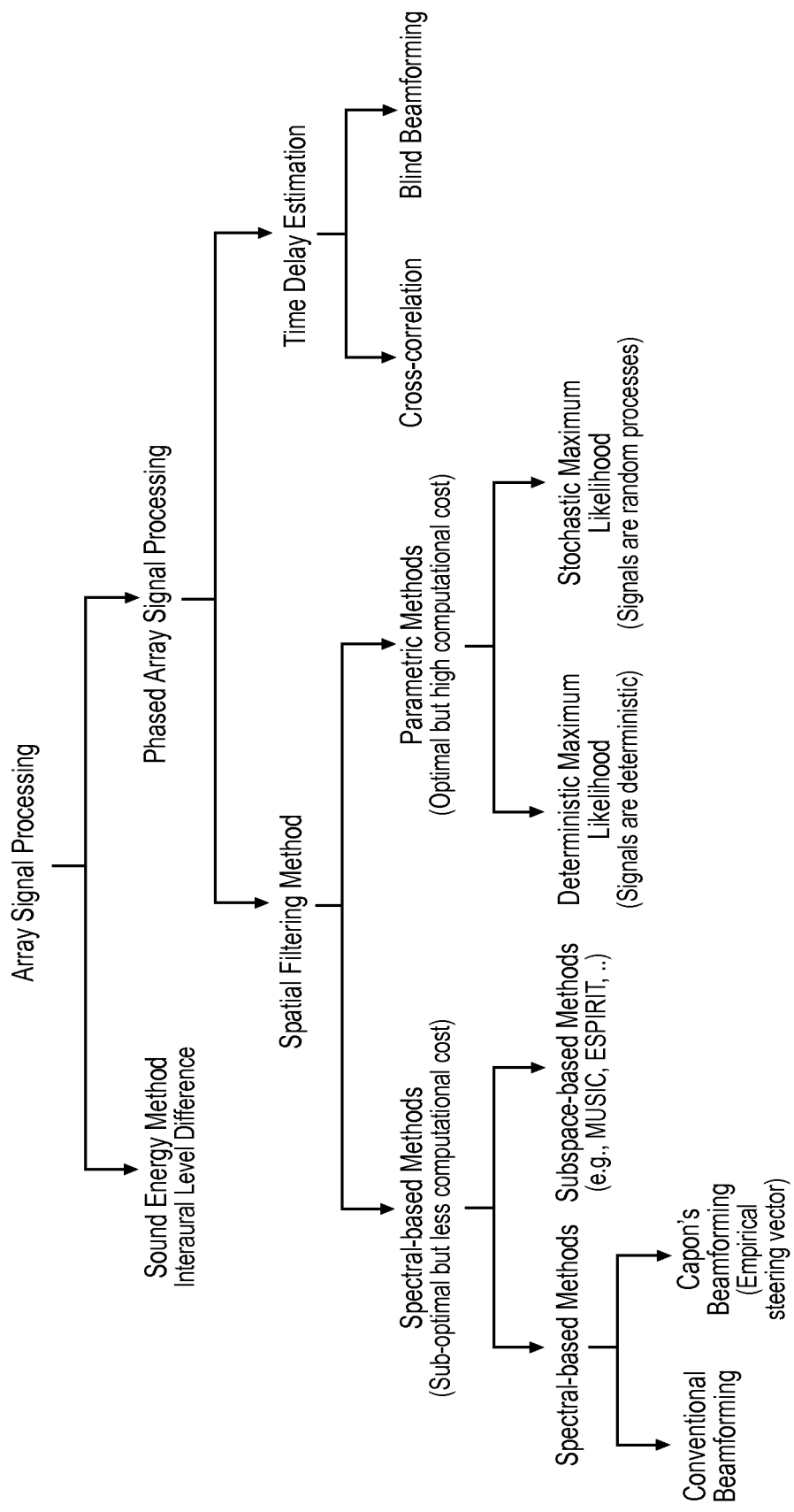
FIG. 3 is a diagram providing an overview of various possible array-signal-processing techniques, in accordance with various embodiments.
Figure 4:
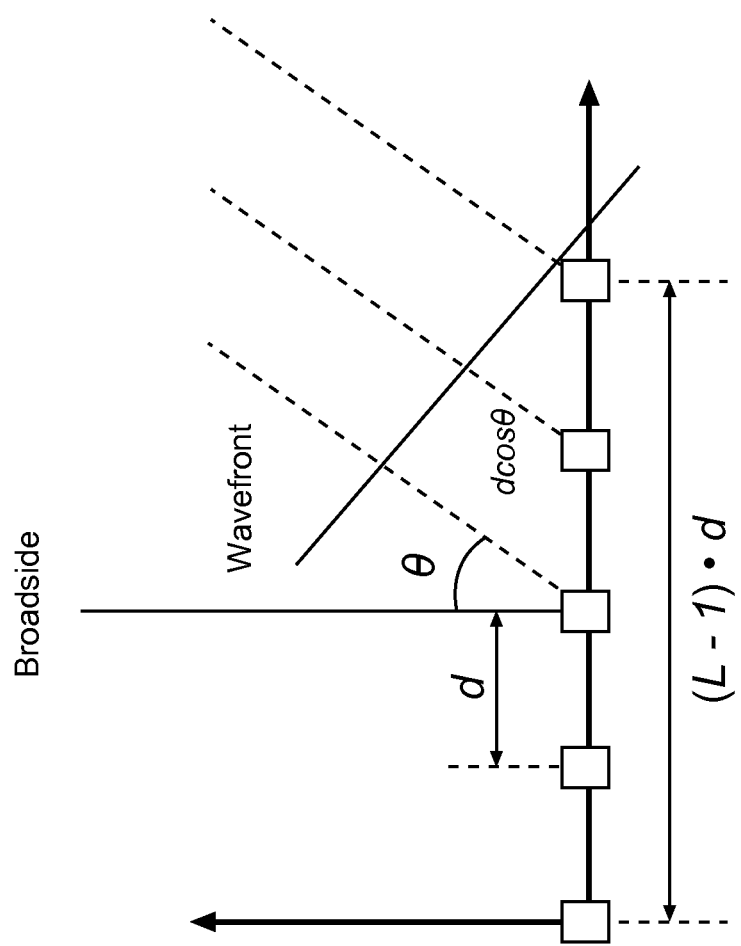
FIG. 4 is a schematic diagram illustrating receipt of a far-field acoustic signal at an acoustic sensor array, in accordance with various embodiments.

In the more complex scenarios typically encountered in flow-detection applications, signal processing generally takes a more complex form. In various embodiments, an array-signal-processing method (such as spatial-filtering) can be employed to fuse the various simultaneously acquired sensor signals and localize the acoustic source. FIG. 3 is a diagram providing an overview of various possible array-signal-processing techniques. To illustrate the principle underlying spatial filtering methods, consider a narrowband, far-field acoustic source generating signal s(t). If acoustic waves emitted from that source impinge a linear array at an angle θ with respect to the normal to the array, as shown in FIG. 4, the sensors within the array measure signals expressed as a vector X(t):

$$X(t) = a(\theta)s(t) + n(t),$$

where a(θ) is a complex-valued vector expressing the amplitude attenuation and phase shift undergone by the signal on its path from the source to the respective sensors, and n(t) is a vector expressing the contribution of noise. Conversely, an unknown source signal can be estimated by fusing the measured signals, in accordance with:

$$y(t) = \frac{1}{L}\Sigma_{i=1}^{L} a_i(\theta) \cdot x_i(t) = \frac{a^H(\theta)}{L} X(t),$$

where L is the number of sensors and the superscript H denotes the conjugate transpose (i.e., the Hermitian). The vector a(θ) encapsulates the forward model of phase propagation, and is often referred to as the steering vector. In the simple case of a uniform medium in which the waves travel at a constant speed of sound c, with a wave vector k=ω/c, a(θ) takes the form:

$$a(\theta) = [1 e^{-ikd\cos\theta} \ldots e^{-i(L-1)kd\cos\theta}]^T,$$

where d is the distance between adjacent sensors of a uniform array.

More generally, array signal processing involves expressing the fused signal y(t) as a weighted linear combination of the measured signals, $$y(t) = \Sigma_{i=1}^{L} w_i^* x_i(t) = w^H X(t),$$

and determining the complex-valued weight vector w based on a suitable heuristic. For example, in conventional beamforming, the weights are selected to maximize the output power of the fused signal at a given incident angle θ:

$$P(w) = \frac{1}{N}\Sigma_{i=1}^{N} |y(t)|^2 = \frac{1}{N}\Sigma_{i=1}^{N} w^H X(t) X^H(t) w = w^H \hat{R} w,$$

where $\hat{R}$ is the sample covariance matrix $$\hat{R} = \frac{1}{N}\Sigma_{i=1}^{N} X(t) X^H(t).$$

The resulting optimization problem takes the form $$\max_{w} E\{w^H X(t) X^H(t) w\} = \max_{w}\{E[|s(t)|^2] \cdot |w^H a(\theta)|^2 + w^H C_n w\}$$

subject to the constraint, |w|=1. The non-trivial solution to this problem is:

$$w = \frac{a(\theta)}{a^H(\theta) a(\theta)} = \frac{a(\theta)}{L}.$$

As another example, in Capon's beamforming method, the optimization problem takes the form $$\min_{w} E\{w^H X(t) X^H(t) w\} = \min_{w}\{E[|s(t)|^2] \cdot |w^H a(\theta)|^2 + w^H C_n w\}$$

subject to the constraint $|w^H a(\theta)|=1$. This method fixes the gain at the incident angle θ and minimizes the noise contribution. The solution is:

$$w = \frac{\hat{R}^{-1} a(\theta)}{a^H(\theta)\hat{R}^{-1}(\theta)}.$$

As can be seen, Capon's method incorporates the data, reflected in the sample covariance matrix $\hat{R}$, with the a-priori known forward model, and is thus one example of so-called "adaptive" spatial filtering methods. Additional methods, for example as summarized in FIG. 3, are known to those of ordinary skill in the art.

The above-described spatial-filtering methods apply under the assumption that the source signal is far away from the sensor array (far-field assumption) such that the time delays of individual sensors are a function of the incident angle θ only. To process near-field signals and further to include the effects of different media between the source and sensor array (e.g., as depicted in FIG. 1), the steering vector a(θ) can be suitably modified, in accordance with various embodiments, to become a function $a(\theta, r_{spherical})$ of θ and the range $r_{spherical}$ of the source, i.e., the distance of the source from the sensor in spherical coordinates, which differs from the perpendicular radial distance of the source from the wellbore axis. The modified steering vector $a(\theta, r_{spherical})$ may depend on a configuration and condition of the wellbore and surrounding formation, taking into account various characteristics and their effect on sound propagation. Such characteristics may include, for example, the geometry and material properties of various layers and their effect on sound propagation may include, for example, the resulting sound velocities in rock, mud, cement, etc. Further, to process broadband signals, the measured signals can be divided into narrow spectral bands, and, following processing of the narrowband signals, the results can be combined in manners well-known to those of ordinary skill in the art.

Figure 5:
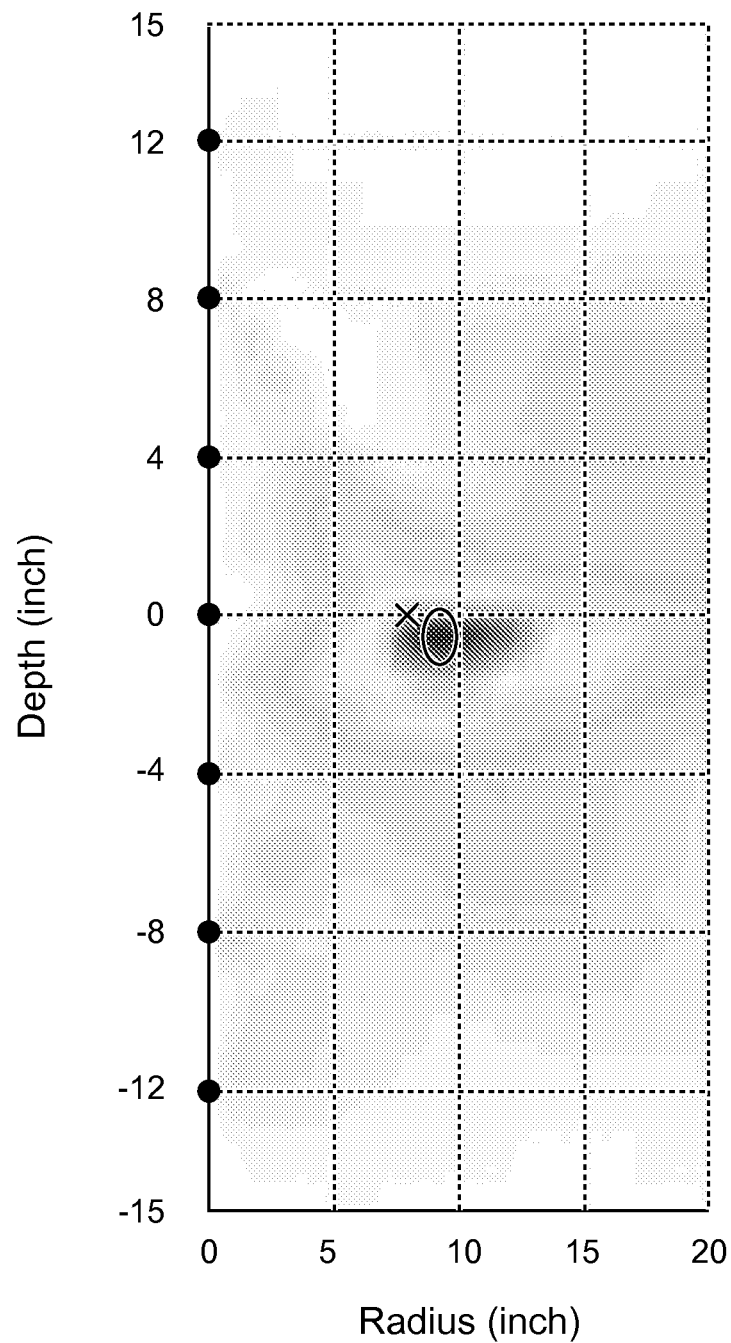
FIG. 5 an example image of an acoustic-source energy level as a function of depth and radial distance determined from array signal processing, in accordance with various embodiments.

A set of acoustic signals measured at the plurality of sensors can be processed by "scanning" a two-dimensional region of interest, along depth and radial-distance, for possible source locations by computing, for each of a plurality of locations considered to be source locations, the fused signal y(t), using a suitable array-signal processing method such as, for example, conventional or Capon's beamforming. These source locations may be characterized by θ and $r_{polar}$, which can both be straightforwardly computed from the radial distance and the depth, relative to the sensor location. FIG. 5 is a two-dimensional image illustrating an example result of such processing for a sensor array including seven uniformly spaced sensors, indicated by the dots on the depth axis, and an acoustic source at the location of the cross. The grey-scale value of the image indicates the energy level of the fused signal, i.e., the acoustic-source energy level, as calculated by array signal processing, at the possible source locations. As can be seen, the computed energy level peaks in the vicinity of the actual acoustic source location. In the absence of a significant acoustic signal source, the image will show only low energy levels. In the case of multiple acoustic sources, the image will show high energy levels at multiple locations. Accordingly, acoustic-signal detection and processing in accordance herewith may facilitate simultaneously detecting multiple flows.

In various embodiments, statistical methods can be employed to detect underground flows based on fused acoustic signal images, such as that depicted in FIG. 5, by discriminating between flow and non-flow scenarios. For this purpose, a library of fused signals for various non-flow scenarios and a library of fused signals for various flow scenarios may be established. The various flow scenarios may include, for example, different types of flows, such as oil, gas, and water flows, and different flow rates or other flow parameters. The data for non-flow scenarios may be collected from historical logging data or during flow-detection logging in real time in situations where the absence of a flow can reasonably be assumed, e.g., logging in a newly completed well. The data for flow scenarios may be collected from logging data of confirmed flow cases, such as leaks through casing. From the libraries, a suitable flow-detection threshold for a binary hypothesis test or similar statistical test may be derived.

Figure 6:
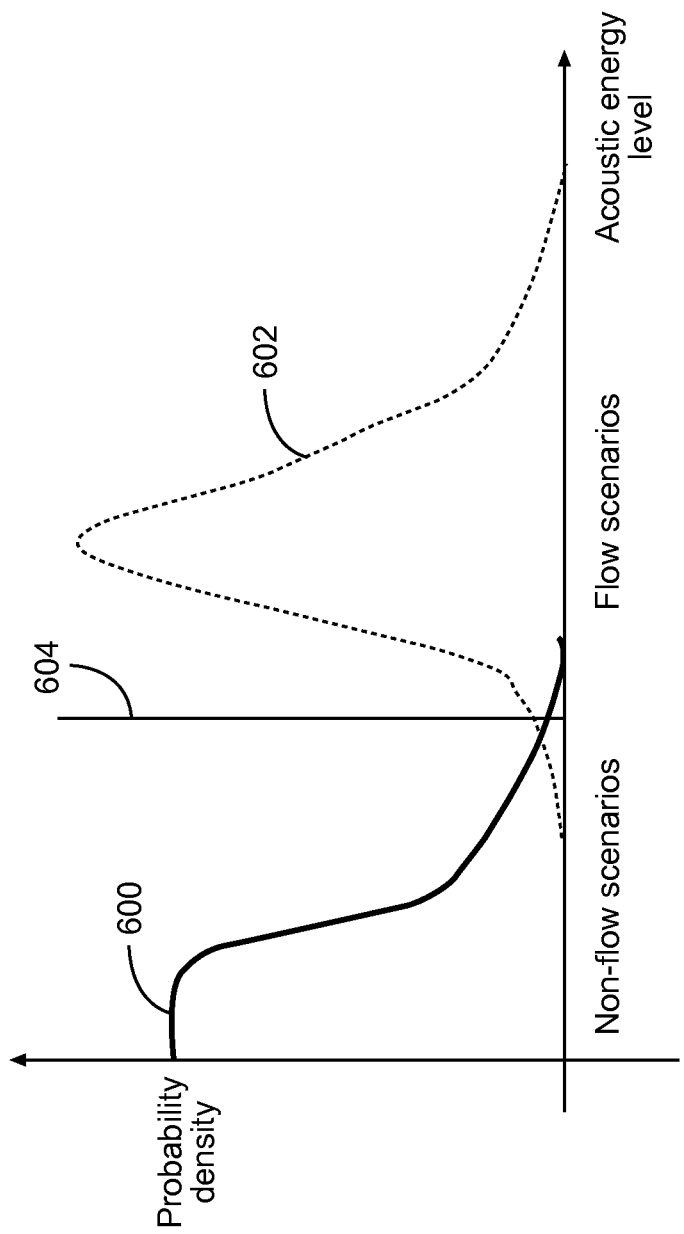
FIG. 6 is a set of plots of example probability distributions for non-flow and flow scenarios as a function of the acoustic source energy level, illustrating a binary-hypothesis test, in accordance with various embodiments.

FIG. 6 is a set of plots of example probability distributions for non-flow and flow scenarios as a function of the acoustic source energy level, illustrating a binary-hypothesis test. The acoustic source energy level may be a local maximum in a two-dimensional image, for example, as shown in FIG. 5. Integrating the non-flow curve 600 from zero to a specified energy level yields the cumulative probability that, if there is no flow, the energy level of the fused signal falls below the specified energy level. Similarly, integrating the flow curve 602 from zero to a specified energy level yields the cumulative probability that, if there is flow, the energy level of the fused signal falls below the specified energy level. As shown, the acoustic energy level tends to be higher under flow conditions; however, there may be some overlap in the energy levels that correspond to flow and non-flow scenarios. A detection threshold 604 may be set in this overlap region, which may be based on statistical metrics such as a false-alarm rate. Applying the binary-hypothesis test, if a measured signal level exceeds the threshold 604, a flow condition is assumed to exist. If the signal falls below the threshold 604, it is assumed that there is no flow. Integrating the flow curve 602 from the detection threshold 604 to infinity yields the sensitivity (probability of true positives) of the test, whereas integrating the flow curve 602 from zero to the detection threshold 604 yields the probability for missed flows (false negatives). Integrating the non-flow curve 600 from zero to the detection threshold 604 yields the specificity (probability of true negatives) of the test, whereas integrating the non-flow curve 600 from the detection threshold 604 to infinity yields the false-alarm probability (false positives).

Figure 7:
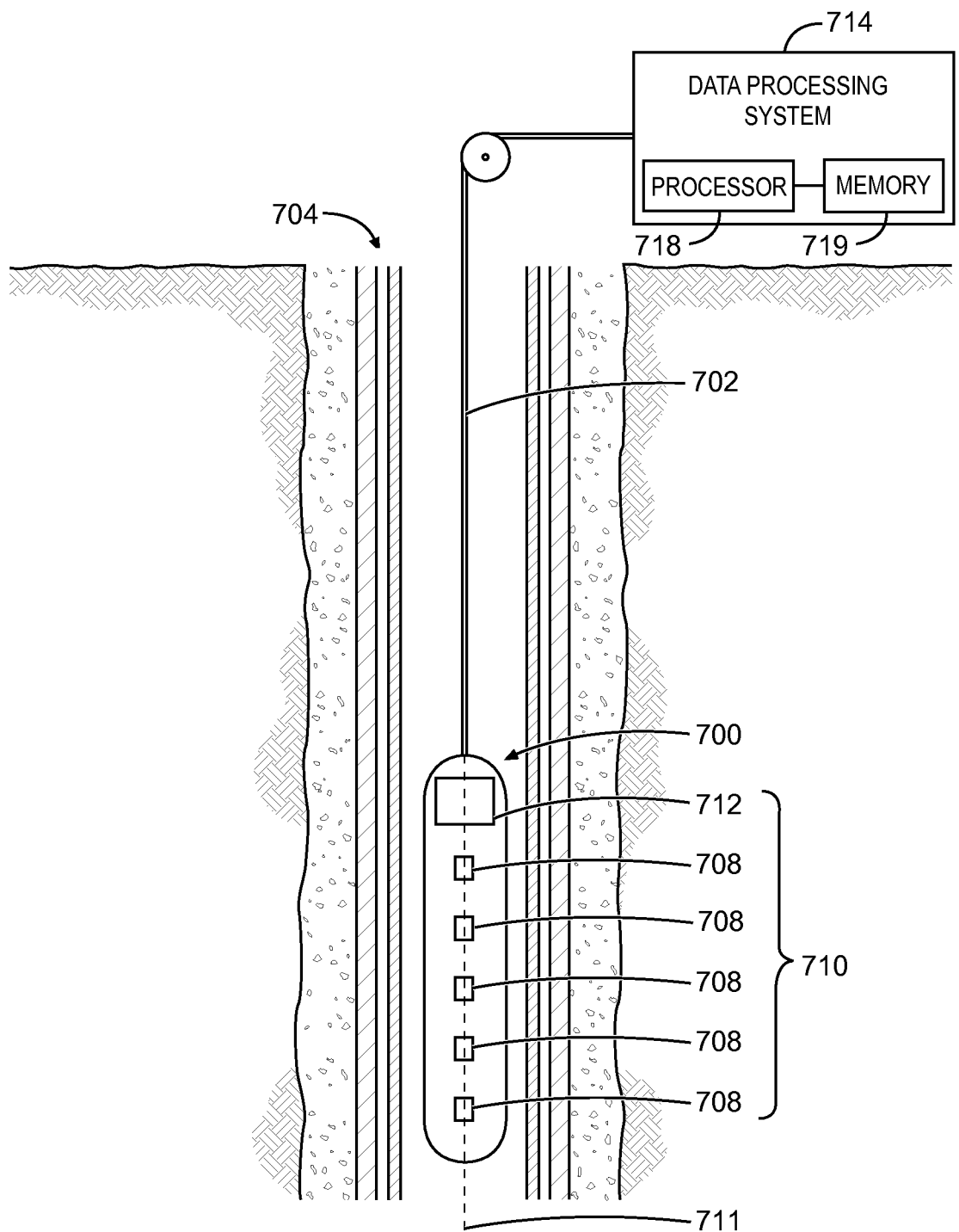
FIG. 7 is a schematic diagram of an example wireline well-logging system, in accordance with various embodiments.

The detection and localization of underground acoustic sources, and, thus, underground flows, can be implemented in both wireline and measuring-while-drilling (MWD) logging operations. FIG. 7 is schematic diagram of an embodiment of an example wireline well-logging system. The system includes a sonde tool 700 suspended from a wireline 702 inside a cased wellbore 704. The tool 700 can be used inside a production tubing 706 through which hydrocarbons are pumped out of the wellbore 704. The tool 700 can include at least three acoustic sensors 708 (such as, e.g., hydrophones), which may be arranged in a linear array 710 along a longitudinal axis 711 of the tool 700 and, thus, of the wellbore 704. Further, the tool may include suitable control and processing circuitry 712, which may, in turn, be in communication (e.g., via a wired connection or a telemetry system) with a surface data-processing system 714. A data-processing facility, providing computational functionality for processing and fusing the acoustic signals received by the individual sensors 708 and detecting and localizing flows based thereon, may be implemented by either one of the control and processing circuitry 712 or the data-processing system 714, or by both in combination. For example, in some embodiments, the control and processing circuitry 712 pre-processes the individual sensor signals (e.g., through signal conditioning, filtering, and/or noise cancellation) and transmits them to the surface data-processing system 714, where the fused signal map is computed, and any flow-induced acoustic sources are detected and localized based thereon. Each of the control and processing circuitry 712 and the surface data-processing system 714 may generally be implemented in hardware or a combination of hardware and software such as with a suitably programmed processor 718 and associated memory 719. In various embodiments, the processed acoustic signals can be evaluated in conjunction with measurements from other sensors, for example, temperature and surface well-pressure measurements, to evaluate flow conditions and overall well integrity.

Alternative sensor configurations may be employed to support acoustic-source detection in a wireline logging operation. For example, in some embodiments, a distributed fiber optic cable is used in place of acoustic point sensors. The fiber optic cable can be permanently installed in the wellbore, e.g., clamped behind the casing or embedded in the cemented annulus. A channel, corresponding to a segment of the fiber-optic cable, can be scanned optically to detect surrounding acoustic signals. In this configuration, different channels at different depths correspond to different acoustic sensors.

Using the sonde tool 700, the acoustic sensor array can search, at a given depth of logging, a predefined two-dimensional space, for example, the array aperture length in the depth direction and a few feet into the formation in the radial direction. This search can be repeated as the array moves to another depth of logging. Thus, within one pass of wireline logging, a region spanning the entire length of the well can be searched for flow-induced acoustic sources. In some embodiments, the acoustic sensor array is operated in a fast logging speed to detect flows initially with coarse spatial resolution. For example, the fast logging speed may be implemented at as much as 60 feet per minute. Once one or more flows have been detected at certain depths, regions at those depths can be re-logged at a slower logging speed, or in stationary mode, to localize the flow(s) at a finer spatial resolution. In embodiments where an acoustic signal is emitted along an extended path (as opposed to from a point source), the whole flow path may be mapped out in a two-dimensional space of depth and radial distance.

Figure 8:
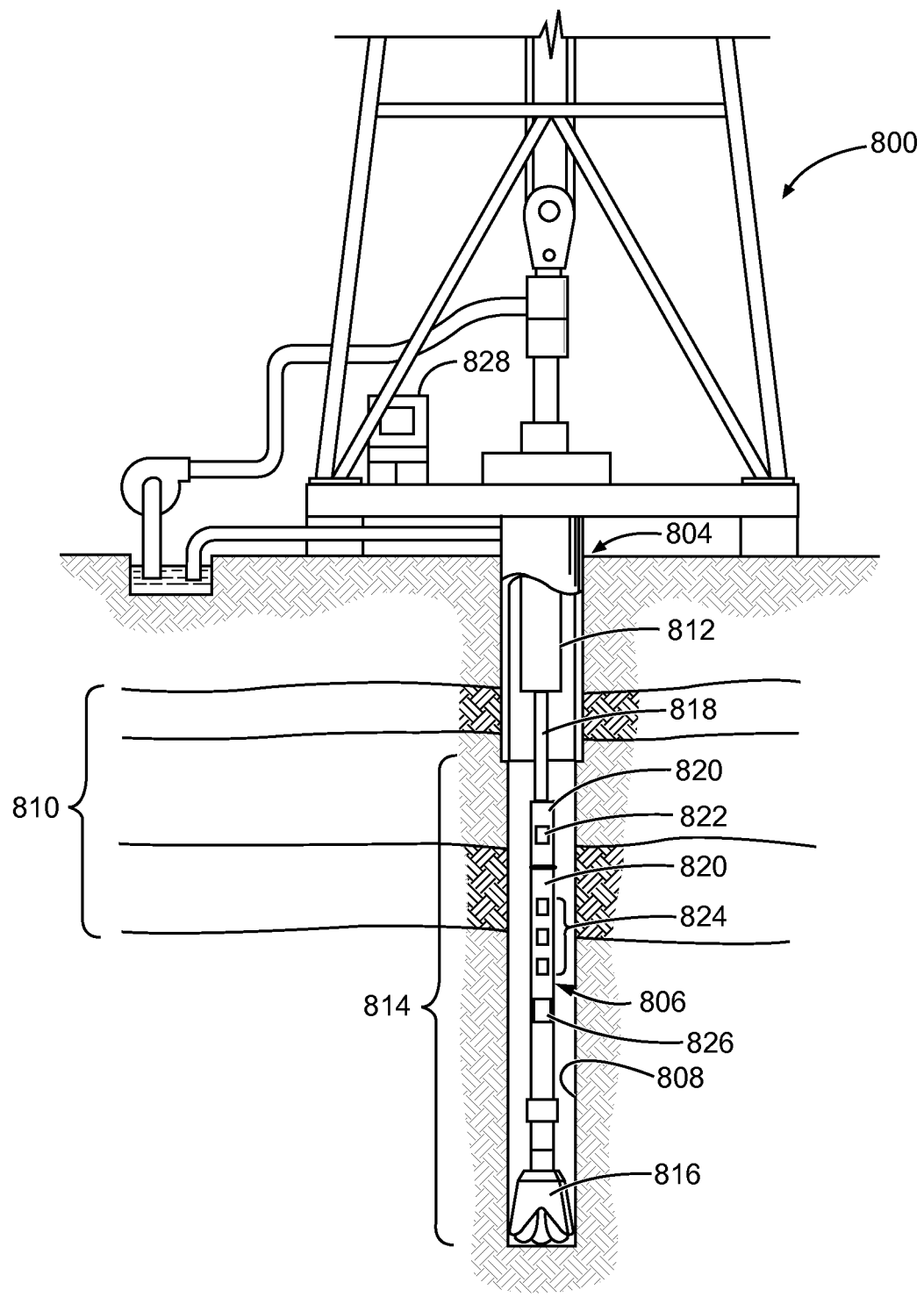
FIG. 8 a schematic diagram illustrating an example system for acoustic-source detection and localization in a measuring-while-drilling logging embodiment, in accordance with various embodiments.

FIG. 8 is a schematic diagram of a system for detecting and localizing underground acoustic sources can also be implemented in a drilling system for MWD logging operations. This may be useful, for example, to detect flows for the purpose of characterizing the formation and hydrocarbon reservoirs, and steer or otherwise adjust drilling based thereon. As shown, the drilling system includes a drilling rig 800 located at the surface of a well 804 and, supported by the drilling rig 800, a drill string 806 for drilling a wellbore 808 through subsurface formations 810. The drill string 806 includes a drill pipe 812 and, generally located at the lower end of the drill pipe 812, a bottom hole assembly (BHA) 814. The BHA 814 may include the drill bit 816 and, disposed thereover, one or more drill collars 818, 820, which may contain a number of different tools and instruments adapted for taking measurements during the drilling process. In accordance with various embodiments, these tool may include an acoustic sensor array 824, for example, including three or more linearly arranged sensors, and associated control and processing circuitry 826. The acoustic sensor array 824 may be in communication with a surface data-processing system 828. Collectively, the acoustic sensor array 824 and the control and processing circuitry 826 and/or data-processing system 828 provide functionality for implementing the above-described methods.

Figure 9:
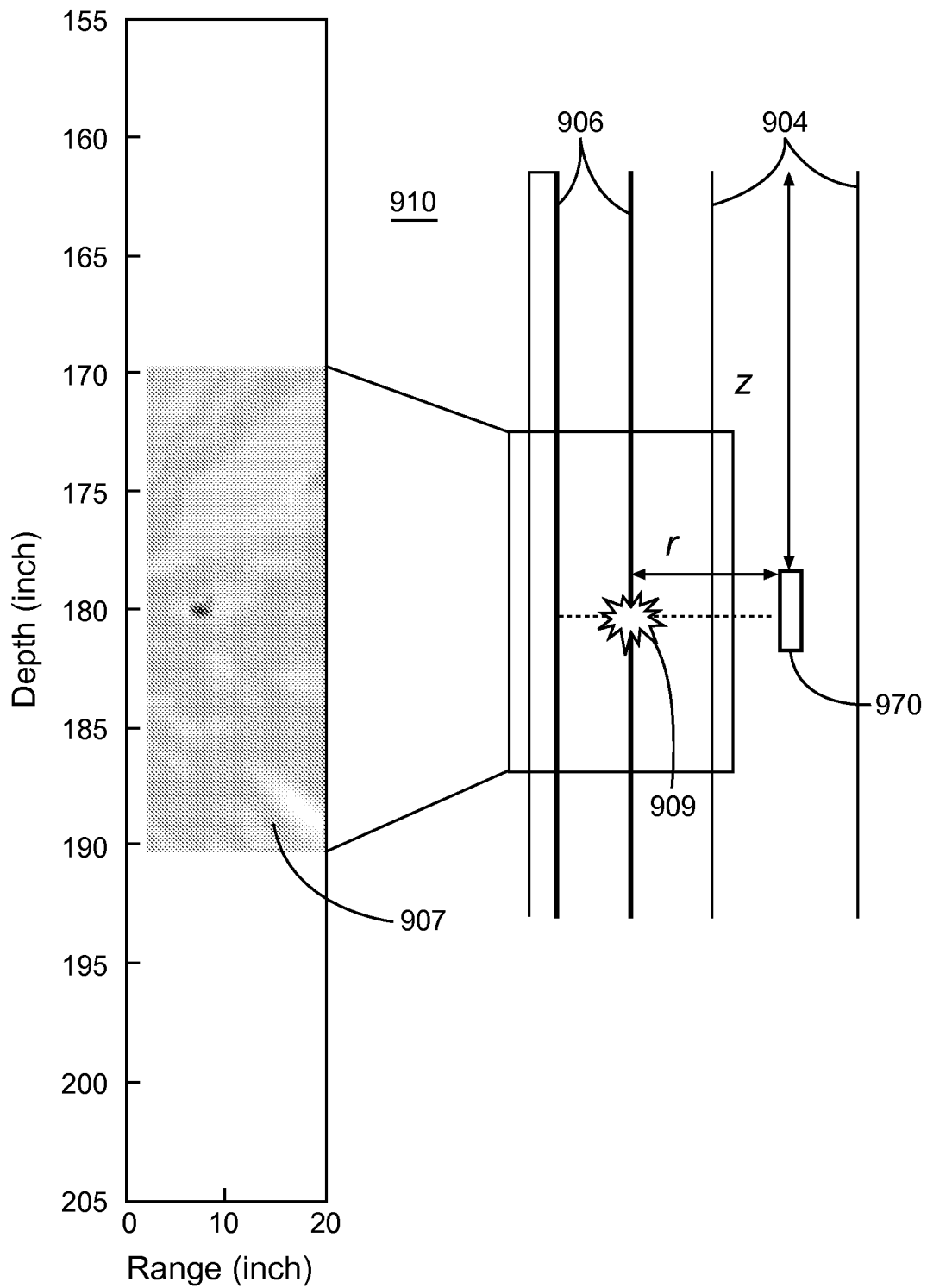
FIG. 9 is a schematic representation of a leak detection scanning image from a single snapshot, in accordance with various embodiments.

As discussed above, a system and method to detect and estimate the locations of leaks inside an oil well can be implemented using an array of acoustic sensors. The array of acoustic sensors may be an array of hydrophones. Post-processing techniques can be implemented to enhance the quality of leak detection results. At a certain depth of the well, the system listens to acoustic signatures, processes them, and produces a beamformed image mapping the location of the leak source as shown in FIG. 9. Herein, a beamformed image is an image resulting from application of a beamforming signal processing method to collected data. Producing the beamformed image results in a set of pixels over a two-dimensional region in which variations in the values or intensities of the pixels reflects the condition of the region being imaged. The existence and location of a leak in the image manifests itself as a variation in the value of its corresponding pixel relative to the pixels corresponding to portions of the image remote from the leak. For a no leak condition, the resulting image would be rather flat with respect to variations. The variations of the pixels on a display of the beamformed image can be presented as variations in shading or color.

Figure 10:
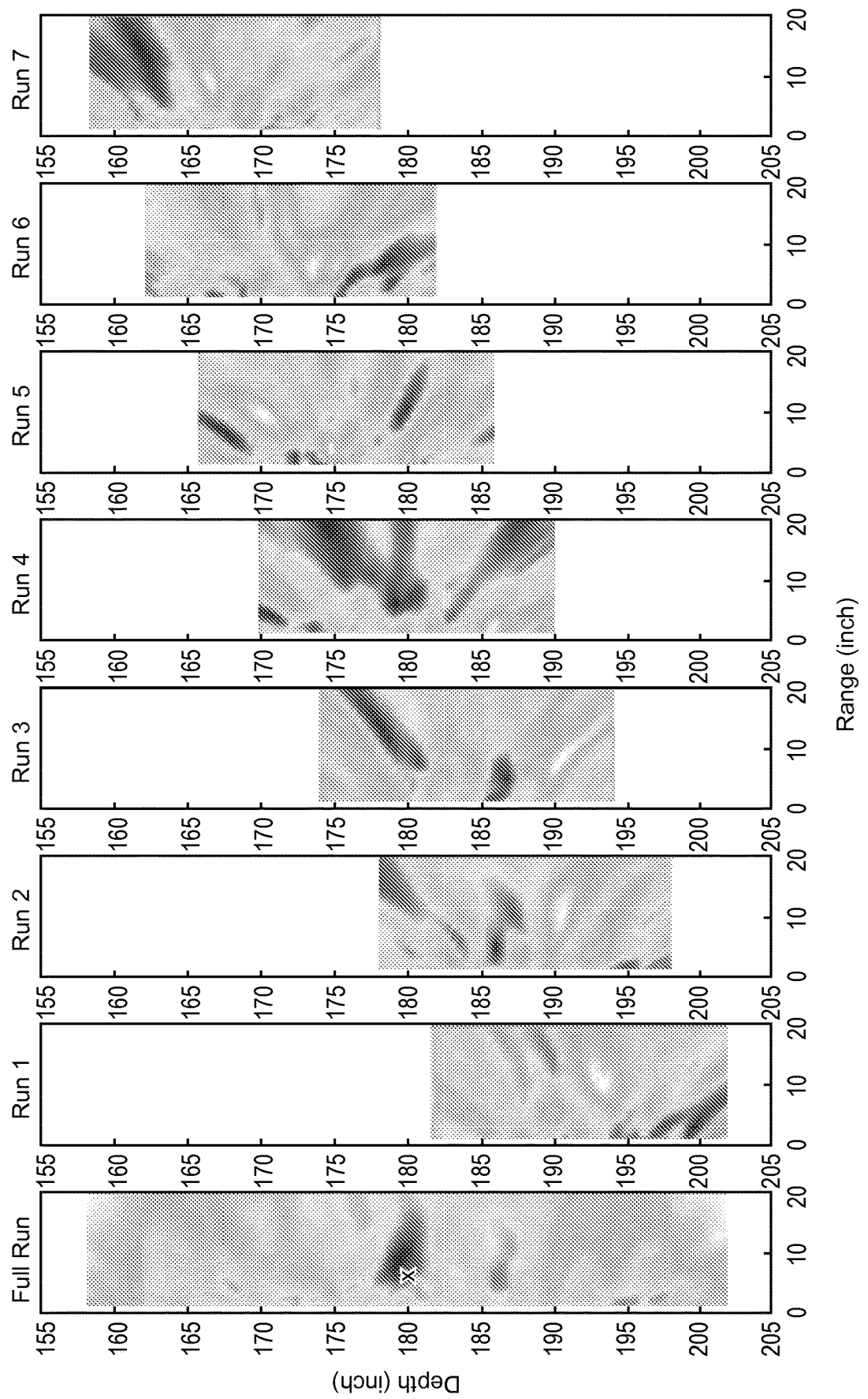
FIG. 10 is a set of simulation results of stitching beamformed images from continuous runs into a full run, in accordance with various embodiments.

FIG. 9 is a schematic representation of a leak detection scanning image 907 from a single snapshot obtained from a leak detection tool 970 moving up in a tubing 904 in a wellbore in which a casing 906 is disposed along a formation 910. In this example, the single snapshot image 907 reveals a leak 909 at a distance r from the leak detection tool 970 at depth z. Alternatively, signals collected by the leak detection tool 970 to form a single image can be obtained by moving down in the tubing 904 in the wellbore. Often, the acoustic signatures are found to be weak in comparison to background acoustics that contains noise due to tool movement within the tubing/casing plus ambient background noise during dynamic logging or ambient background noise during stationary logging at a given depth. Hence, the results from each individual tool runs could be very blurry as illustrated in runs 2-7 of FIG. 10. FIG. 10 is a set of simulation results of stitching beamformed images from continuous runs into a full run. The individual images in runs 2-7 can have the same length along the depth and the same range, which provides an amount of convenience in processing. However, the techniques taught herein are not limited to images of the dimensions.

Figure 11:
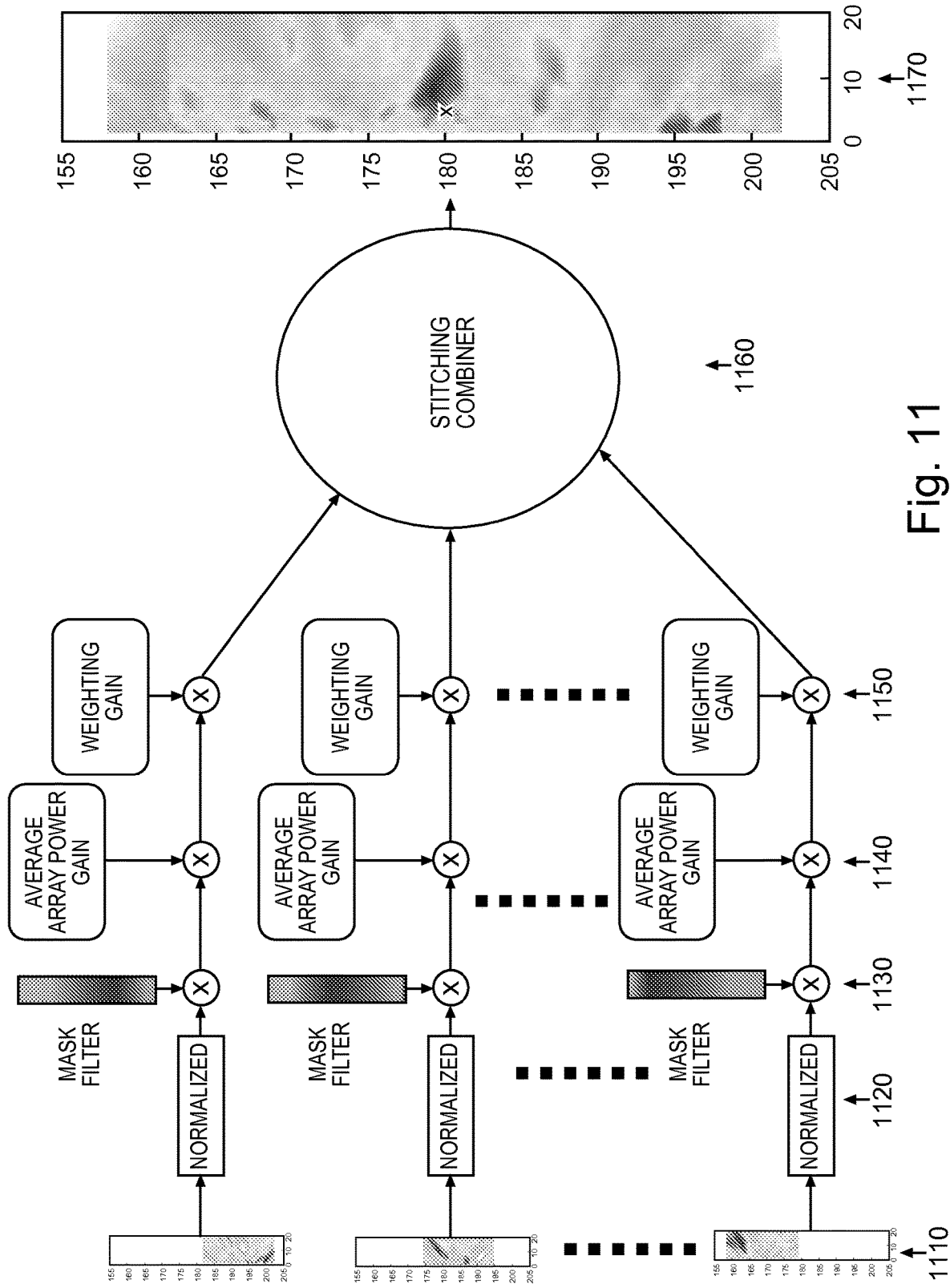
FIG. 11 is a flow diagram depicting an example stitching method to combine a sequence of beamformed images, in accordance with various embodiments.

Taking advantage of the tool movement that can produce a sequence of overlapping beamformed images, a post-processing technique can be implemented to combine those images in a way that enhances the focus on the leak location enabling more accurate estimation. FIG. 11 is a flow diagram depicting an embodiment of a stitching method to combine a sequence of beamformed images as the tool moves, which shows the overall algorithm of this example stitching method. In various embodiments, a stitching technique operates on a set of beamformed images that overlap including selectively weighting different pixels on the image with different weights, and then combining them in order to produce an enhanced image.

As the tool moves in the well, acoustic signals are collected and a sequence of beamformed images is generated corresponding to each depth where the tool was, at 1110. The beamformed image may be computed as output of a Capon beamformer, or other beamformer. At each location (r, z), where r is range and z is depth, the likelihood of having the leak at that location is $$P(r, z) = \frac{1}{a^*(r, z)R^{-1}a(r, z)},$$

where R is a covariance matrix of the recorded array signals, a(r, z) is the steering vector at location (r, z), and a*(r, z) is the complex conjugate of the steering vector at location (r, z). The steering vector can be computed directly from theoretical time delay or from simulation model. The steering vector can be associated with the different acoustic sensors being used in the tool.

Once the beamformed images are generated, each image can be normalized, at 1120, and then masked with a 2D filter, at 1130. Normalization can provide for the signal received in from different sensors to have the same energy level, which may be used to avoid a biased condition. With respect to a received waveform, phase information is mainly considered, the phase provides amount of delay between waveforms received. The amplitudes of the waveform may not be taken into account when the time delay is the characteristic of interest to be preserved. Normalization may be used to give the waveforms the same amplitude. The mask filter can be designed to take into account the confidence level of source location estimation at each point on the beamformed image. One method of generating the mask filter can be based on the Cramer-Rao Lower Bound (CRLB), which essentially states a bound on the variance of any unbiased estimator. The above likelihood P(r, z) computes the intensity of the pixel at (r, z) providing the estimator. In this 2-D source localization problem, CRLB at a location (r, z) can be computed by the inverse of the Fisher Matrix F:

$$F^{-1} = \sigma_{Noise}^2 \begin{bmatrix} \sum_{s=1}^{N} \left(\frac{\partial f_s}{\partial r}\right)^2 & \sum_{s=1}^{N} \left(\frac{\partial f_s}{\partial r} \frac{\partial f_s}{\partial r}\right) \\ \sum_{s=1}^{N} \left(\frac{\partial f_s}{\partial r} \frac{\partial f_s}{\partial r}\right) & \sum_{s=1}^{N} \left(\frac{\partial f_s}{\partial z}\right)^2 \end{bmatrix}^{-1},$$

where N is a number of sensors on the tool and $\left(\frac{\partial f_s}{\partial r}\right)$ and $\left(\frac{\partial f_s}{\partial z}\right)$ are the partial derivatives of sensor response at location (r, z).

At 1140, the outcome of the masking can be multiplied with a gain that is computed directly from the array signals. The role of this gain is to capture the effect of distance from the leak source, if present, to the array. If the tool is close to the leak location/source, the gain is high and therefore the beamformed output is given more weight when combining. For example, one way to compute that gain is to use the amplitude of the signal from the sensor at the middle of the array.

After this stage, another optional stage can be implemented, at 1150, where another weighting gain multiplier is applied to the images before stitching. These optional weighting gains can be designed to evaluate the focus level of the original beamformed images. One way to measure the focus level of an image is through frequency analysis such as with fast Fourier Transform (FFT). By measuring the energy at high frequencies, the extent to which the image is noisy can be evaluated. Applying the FFT on a two-dimensional beamformed image that includes substantial variations, there is more energy at the high frequency because things changing fast. If an image is smooth, there is more energy towards the lower-frequency end and then less energy at the high-frequency end. The amount of the energy portion that allocates into the high frequency and into the lower frequencies can be determined and weights can be assigned. Energy thresholds can be used to make the assignments.

Figure 12:
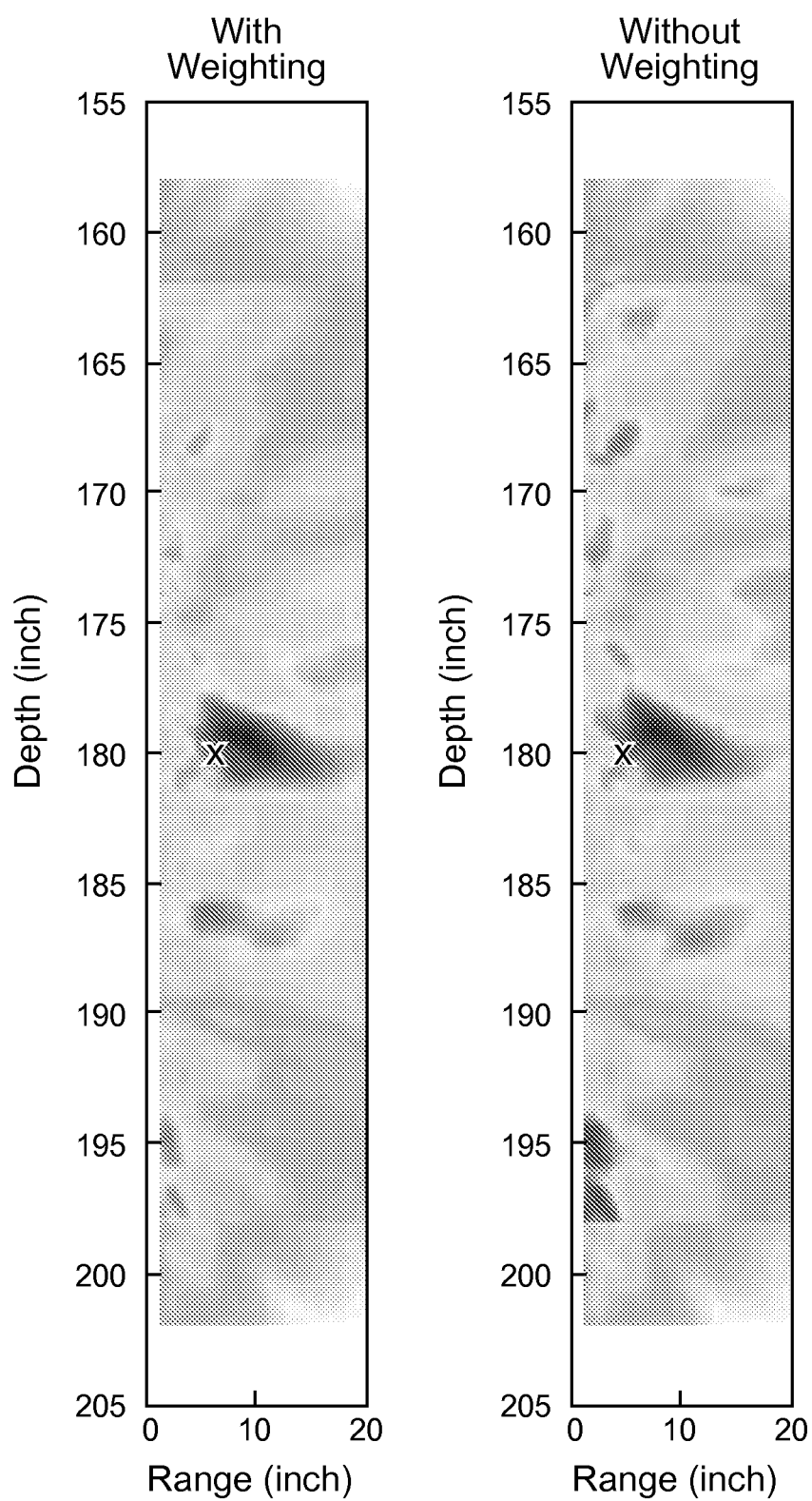
FIG. 12 is a presentation of images showing a comparison between results with weighting gains vs without weighting gains, in accordance with various embodiments.

At 1160, a stitching combiner is applied combining together the images of each processed beamformed image at each position (r, z). The summing can be performed over corresponding pixels of different processed beamformed images. At 1170, results of the stitching combiner are provided as a stitched image over the range of depth provided by the collected signals from the movement of the measuring tool. FIG. 12 is a presentation of images showing a comparison between results with the weighting gains vs without the weighting gains. Improvement in results using these weighting gains versus not using them is shown in FIG. 12.

Figure 13:
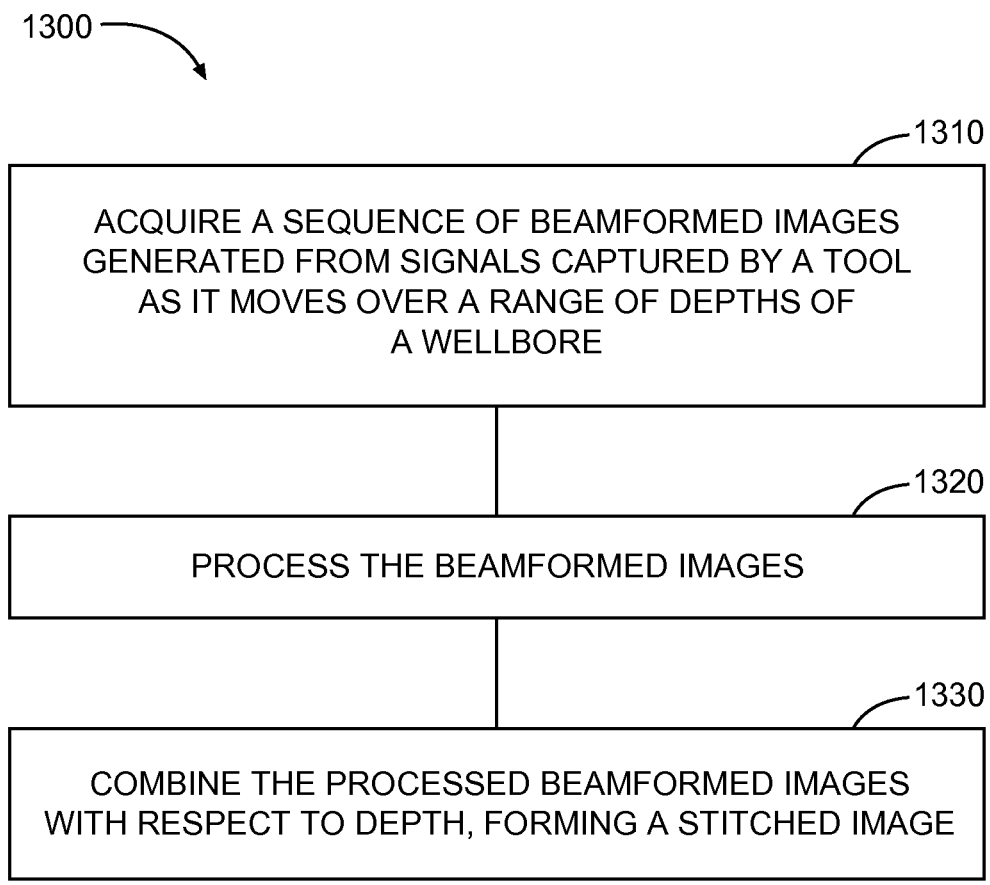
FIG. 13 is a flow diagram of features of an example method to combine a sequence of beamformed images, in accordance with various embodiments.

FIG. 13 is a flow diagram of an embodiment of features of an example method 1300 of imaging a region in a wellbore. The imaging can include imaging a leak in a structure in the wellbore. At 1310, a sequence of beamformed images generated from signals captured by a tool as it moves over a range of depths of the wellbore is acquired. Each beamformed image can overlap at least one other beamformed image of the sequence. At 1320, the beamformed images are processed. At 1330, the processed beamformed images are combined with respect to depth, forming a stitched image. The combining of the processed beamformed images can be realized by combining the image of each processed beamformed image at each location over the range of depths, on a location by location basis. Processed beamformed images that do not include an image at a location do not contribute to the combination forming the stitched image at the respective location.

The method 1300 or methods similar to method 1300 can include conducting the processing to include: normalizing each beamformed image of the sequence; applying a mask filter to each normalized beamformed image of the sequence; multiplying each outcome of applying the mask filter by a gain, forming a product for each pair of outcome and gain; and combining representations of each product to form the stitched image. Combining representations of each multiplicative product may include directly combining each product. In another embodiment, combining representations of each product may include combining the representations, where the representations of each product are results of multiplying each multiplicative product by a weighting gain. Such methods can include generating the weighting gain from a frequency analysis of the signals captured by the acoustic tool.

Embodiments of the method 1300 or methods similar to method 1300 in which each outcome of applying the mask filter is multiplied by a gain can include multiplying each outcome by an average power of the signals captured by the acoustic tool. Embodiments of the method 1300 or methods similar to method 1300 in which a mask filter is applied can include generating the mask filter based on a Cramer-Rao Lower Bound at a location (r, z) where z is depth and r is range. The Cramer-Rao Lower Bound at a location (r, z) can be computed by an inverse of a Fisher Matrix based on the tool having a number of sensors and on partial derivatives of each sensor response at location (r, z) with respect to r and z.

In various embodiments, a machine-readable storage device can comprise instructions stored thereon, which, when performed by a machine, cause the machine to perform operations, the operations comprising and/or controlling one or more features similar to or identical to features of methods and techniques described with respect to method 1300, variations thereof, and/or features of other methods taught herein. The physical structures of such instructions may be operated on by one or more processors. The instructions can include instructions to operate a tool or tools having sensors disposed in a wellbore to provide data to process in accordance with the teachings herein.

Executing these physical structures can cause the machine to perform operations, the operations comprising: acquiring a sequence of beamformed images generated from signals captured by a tool as it moves over a range of depths of a wellbore, each beamformed image overlapping at least one other beamformed image of the sequence; processing the beamformed images; and combining the processed beamformed images with respect to depth, forming a stitched image.

Executing the instructions can include a number of additional features. The processing can include: normalizing each beamformed image of the sequence; applying a mask filter to each normalized beamformed image of the sequence; multiplying each outcome of applying the mask filter by a gain, forming a product for each pair of outcome and gain; and combining representations of each product to form the stitched image. Combining representations of each product may include directly combining each multiplicative product. Combining representations of each product may include the representations of each product being results of multiplying each multiplicative product by a weighting gain. The operations can include generating the weighting gain from a frequency analysis of the signals captured by the acoustic tool. Multiplying each outcome of applying the mask filter by a gain can include multiplying each outcome by an average power of the signals captured by the acoustic tool. Applying the mask filter can include generating the mask filter based on a Cramer-Rao Lower Bound at a location (r, z) where z is depth and r is range. The Cramer-Rao Lower Bound at a location (r, z) can be computed by an inverse of a Fisher Matrix based on the tool having a number of acoustic sensors and on partial derivatives of each sensor response at location (r, z) with respect to r and z.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory 1435 of FIG. 14. While memory 1435 is shown as a single unit, terms such as "memory module," "machine-readable medium," " machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory module," "machine-readable medium," "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a " machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

A system can comprise: a tool having one or more acoustic sensors operable in a wellbore and a processor arranged to: acquire a sequence of beamformed images generated from signals captured by the tool over a range of depths of the wellbore, each beamformed image overlapping at least one other beamformed image of the sequence; process the beamformed images; and combine the processed beamformed images with respect to depth, forming a stitched image. The one or more acoustic sensors can be hydrophones.

The processing of the beamformed images can be conducted by the processor arranged to: normalize each beamformed image of the sequence; apply a mask filter to each normalized beamformed image of the sequence; multiply each outcome of application of the mask filter by a gain, to form a product for each pair of outcome and gain; and combine representations of each product to form the stitched image. Application of the mask filter can include generation of the mask filter based on a Cramer-Rao Lower Bound at a location (r, z) where z is depth and r is range. The Cramer-Rao Lower Bound at a location (r, z) can be a result of computation by an inverse of a Fisher Matrix based on the number of acoustic sensors of the tool and on partial derivatives of each acoustic sensor response at location (r, z) with respect to r and z. The processor arranged to multiply each outcome of application of the mask filter by a gain may include the processor arranged to multiply each outcome by an average power of the signals captured by the acoustic tool. The combination of the representations of each product can be a direct combination of each multiplicative product. Alternatively, the representations of each product are results of multiplication of each multiplicative product by a weighting gain. The processor can be arranged to generate the weighting gain from a frequency analysis of the signals captured by the acoustic tool.

Such systems and associated methods can be implemented with user interfaces, which can provide a device that allows user interaction. A user interface can include a display unit and underlining electronics that allow input and output of signals associated with managing and providing data to the display unit. A user interface can be interactive providing a mechanism for input from a user, which may be in response to information displayed to the user by the user interface. A user interface may include hardware and logical components.

In such systems, the display unit can include a touch screen. The system can include a pointing device operable with the user interface to provide user inputs used in the operation of the sensors and the combination of processed beamformed images to form a stitched image. The pointing device can be realized by a device that determines motion relative to a surface, which is typically a two-dimensional motion that is translated into the motion of a visual pointer on a display screen. An example of such a pointing device is a computer mouse.

Figure 14:
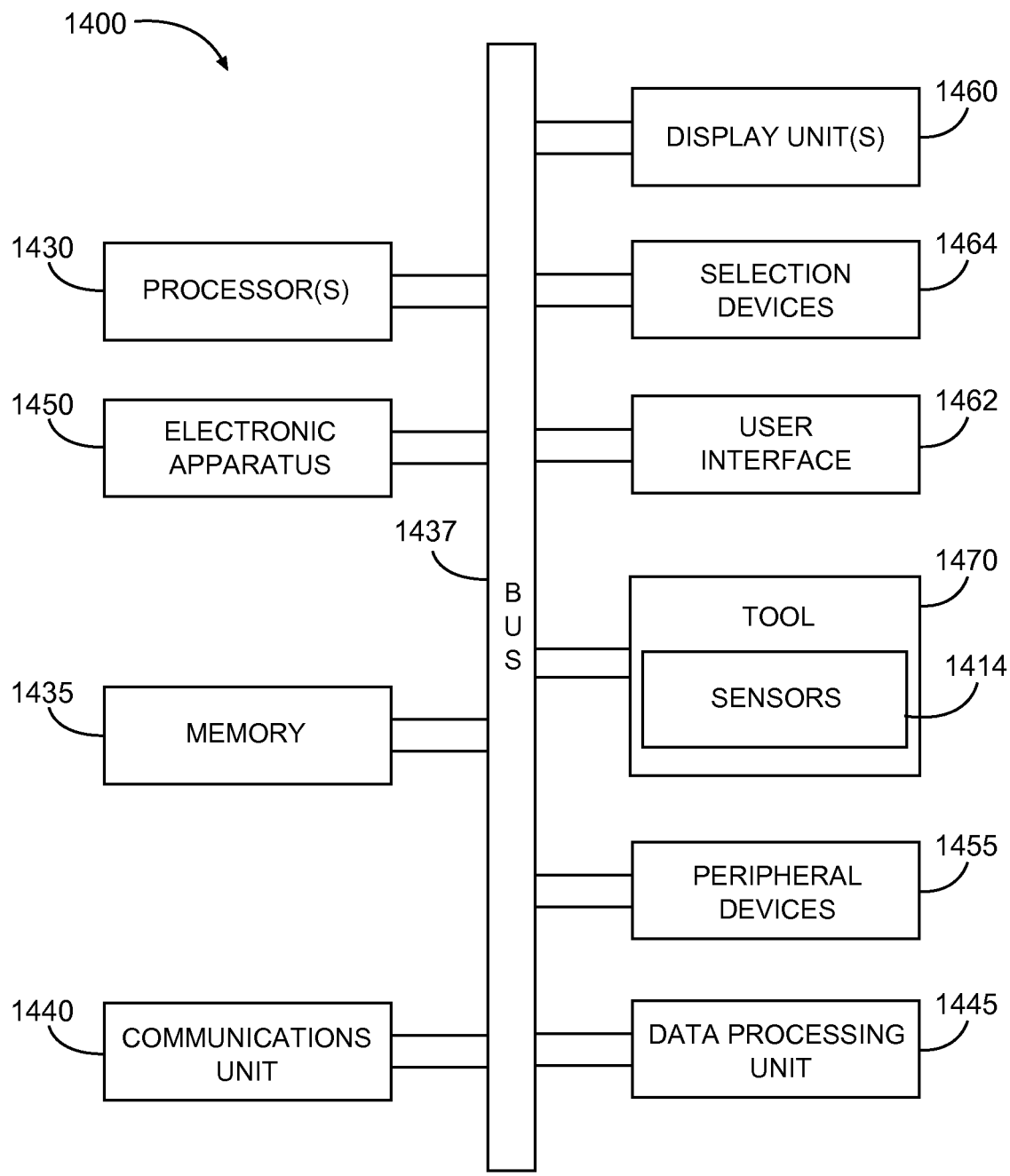
FIG. 14 is a block diagram of features of an example system operable to execute schemes associated with forming a stitched image from a set of beamformed images, in accordance with various embodiments.

FIG. 14 is a block diagram of features of an embodiment of an example system 1400 operable to execute schemes associated with a sequence of beamformed images generated from signals captured by a tool as it moves over a range of depths of a wellbore and a combination of the beamformed images processed to form a stitched image. System 1400 can include one or more processors 1430, a user interface 1462 operable with the one or more processors 1430, a data processing unit 1445 operable with the user interface 1462, where the one or more processors 1430, the user interface 1462, and the data processing unit 1445 are structured to be operated according to any scheme similar to or identical to the schemes associated with combining processed beamformed images to form a stitched image as taught herein. In an embodiment, processor(s) 1430 can be realized as a single processor or a group of processors. Processors of the group of processors may operate independently depending on an assigned function. The system 1400 can be arranged to perform various operations on the data, acquired from a tool 1470 operational in a wellbore, in a manner similar or identical to any of the processing techniques discussed herein. The tool 1470 can include sensors 1414. The sensors 1414 can be acoustic sensors, such as taught herein.

The system 1400 can be arranged as a distributed system and can include components in addition to the one or more processors 1430, the user interface 1462, and the data processing unit 1445. Data from operating the tool 1470 at various depths in the wellbore can be processed to combine processed beamformed images to form a stitched image, as taught herein, by the one or more processors 1430, the user interface 1462, and the data processing unit 1445. The data processing unit 1445 may be implemented to analyze the stitched images to provide proper remedial actions with respect to detection of one or more leaks. The data processing unit 1445 may be implemented as a stand-alone unit with its own set of processors and memory.

The system 1400 can include a memory 1435, an electronic apparatus 1450, and a communications unit 1440. The processor(s) 1430, the memory 1435, and the communications unit 1440 can be arranged to operate as a processing unit to control management of tool 1470 and to perform operations on data signals collected by the sensors 1414 of tool 1470. The memory 1435 can include a database having information and other data such that the system 1400 can operate on data from the tool 1470. In an embodiment, the data processing unit 1445 can be distributed among the components of the system 1400 including memory 1435 and/or the electronic apparatus 1450.

The communications unit 1440 can include downhole communications for communication to the surface at a well site from the tool 1470 in a wellbore. Such downhole communications can include a telemetry system. The communications unit 1440 may use combinations of wired communication technologies and wireless technologies at frequencies that do not interfere with on-going measurements. The communications unit 1440 can allow for a portion or all of the data analysis to be conducted within a wellbore with results provided to the user interface 1462 for presentation on the one or more display unit(s) 1460 aboveground. The communications unit 1440 can provide for data to be sent aboveground such that substantially all analysis is performed aboveground. The data collected by the tool 1470 can be stored with the tool 1470 that can be brought to the surface to provide the data to the one or more processors 1430, the user interface 1462, and the data processing unit 1445. The communications unit 1440 can allow for transmission of commands to tool 1470 in response to signals provided by a user through the user interface 1462.

The system 1400 can also include a bus 1437, where the bus 1437 provides electrical conductivity among the components of the system 1400. The bus 1437 may include an address bus, a data bus, and a control bus, each independently configured. The bus 1437 can be realized using a number of different communication mediums that allows for the distribution of components of the system 1400. Use of the bus 1437 can be regulated by the processor(s) 1430. The bus 1437 can include a communications network to transmit and receive signals including data signals and command and control signals.

In various embodiments, the peripheral devices 1455 can include additional storage memory and/or other control devices that may operate in conjunction with the processor(s) 1430 and/or the memory 1435. The display unit(s) 1460 can be arranged with a screen display, as a distributed component on the surface, that can be used with instructions stored in the memory 1435 to implement the user interface 1462 to manage the operation of the tool 1470 and/or components distributed within the system 1400. Such a user interface can be operated in conjunction with the communications unit 1440 and the bus 1437. The display unit(s) 1460 can include a video screen, a printing device, or other structure to visually project data/information. The system 1400 can include a number of selection devices 1464 operable with the user interface 1462 to provide user inputs to operate the data processing unit 1445 or its equivalent. The selection device(s) 1464 can include one or more of a touch screen or a pointer device operable with the user interface 1462 to provide user inputs to operate the data processing unit 1445.

A method 1 can comprise: acquiring a sequence of beamformed images generated from signals captured by a tool as it moves over a range of depths of a wellbore, each beamformed image overlapping at least one other beamformed image of the sequence; processing the beamformed images; and combining the processed beamformed images with respect to depth, forming a stitched image.

A method 2 can include elements of method 1 and can include normalizing each beamformed image of the sequence; applying a mask filter to each normalized beamformed image of the sequence; multiplying each outcome of applying the mask filter by a gain, forming a product for each pair of outcome and gain; and combining representations of each product to form the stitched image.

A method 3 can include elements of method 2 and can include combining representations of each product to include directly combining each product.

A method 4 can include elements of method 2 and can include the representations of each product being results of multiplying each product by a weighting gain.

A method 5 can include elements of any of methods 2-4 and can include generating the weighting gain from a frequency analysis of the signals captured by the acoustic tool.

A method 6 can include elements of any of methods 2-5 and can include multiplying each outcome of applying the mask filter by a gain to include multiplying each outcome by an average power of the signals captured by the acoustic tool.

A method 7 can include elements of any of methods 2-6 and can include applying the mask filter to include generating the mask filter based on a Cramer-Rao Lower Bound at a location (r, z) where z is depth and r is range.

A method 8 can include elements of method 7 and can include the Cramer-Rao Lower Bound at location (r, z) computed by an inverse of a Fisher Matrix based on the tool having a number of sensors and on partial derivatives of each sensor response at location (r, z) with respect to r and z.

A machine-readable storage device 1 having instructions stored thereon, which, when executed by one or more processors of a machine, cause the machine to perform operations, the operations comprising: acquiring a sequence of beamformed images generated from signals captured by a tool as it moves over a range of depths of a wellbore, each beamformed image overlapping at least one other beamformed image of the sequence; processing the beamformed images; and combining the processed beamformed images with respect to depth, forming a stitched image.

A machine-readable storage device 2 can include structure of machine-readable storage device 1 and can include operations comprising: normalizing each beamformed image of the sequence; applying a mask filter to each normalized beamformed image of the sequence; multiplying each outcome of applying the mask filter by a gain, forming a product for each pair of outcome and gain; and combining representations of each product to form the stitched image.

A machine-readable storage device 3 can include structure of machine-readable storage device 2 and can include operations comprising combining representations of each product to include directly combining each product.

A machine-readable storage device 4 can include structure of machine-readable storage device 2 and can include the representations of each product being results of multiplying each product by a weighting gain.

A machine-readable storage device 5 can include structure of any of machine-readable storage devices 2-4 and can include operations to include generating the weighting gain from a frequency analysis of the signals captured by the acoustic tool.

A machine-readable storage device 6 can include structure of any of machine-readable storage devices 2-5 and can include operations multiplying each outcome of applying the mask filter by a gain to include multiplying each outcome by an average power of the signals captured by the acoustic tool.

A machine-readable storage device 7 can include structure of any of machine-readable storage device 6 and can include operations applying the mask filter to include generating the mask filter based on a Cramer-Rao Lower Bound at a location (r, z) where z is depth and r is range.

A machine-readable storage device 8 can include structure of any of machine-readable storage devices 7 and can include the Cramer-Rao Lower Bound at location (r, z) being computed by an inverse of a Fisher Matrix based on the tool having a number of acoustic sensors and on partial derivatives of each sensor response at location (r, z) with respect to r and z.

A system 1 can comprise: a tool having one or more acoustic sensors operable in a wellbore; and a processor arranged to: acquire a sequence of beamformed images generated from signals captured by the tool over a range of depths of the wellbore, each beamformed image overlapping at least one other beamformed image of the sequence; process the beamformed images; and combine the processed beamformed images with respect to d.

A system 2 can include structure of system 1 and can include the processor arranged to process the beamformed images to include the processor arranged to: normalize each beamformed image of the sequence; apply a mask filter to each normalized beamformed image of the sequence; multiply each outcome of application of the mask filter by a gain, to form a product for each pair of outcome and gain; and combine representations of each product to form the stitched image.

A system 3 can include structure of system 2 and can include the combination of the representations of each product being a direct combination of each product.

A system 4 can include structure of system 2 and can include the representations of each product being results of multiplication of each product by a weighting gain.

A system 5 can include structure of any of systems 2-4 and can include the processor arranged to generate the weighting gain from a frequency analysis of the signals captured by the acoustic tool A system 6 can include structure of any of systems 2-5 and can include the processor arranged to multiply each outcome of application of the mask filter by a gain to include the processor arranged to multiply each outcome by an average power of the signals captured by the acoustic tool A system 7 can include structure of any of systems 2-6 and can include application of the mask filter to include generation of the mask filter based on a Cramer-Rao Lower Bound at a location (r, z) where z is depth and r is range A system 8 can include structure of system 7 and can include the Cramer-Rao Lower Bound at location (r, z) being a result of computation by an inverse of a Fisher Matrix based on the number of acoustic sensors of the tool and on partial derivatives of each acoustic sensor response at location (r, z) with respect to r and z.

A system 8 can include structure of any of systems 1-8 and can include the one or more acoustic sensors being hydrophones.

In contrast to current designs of leak detection tools built with an algorithm generating non-overlapping beamformed images, techniques as taught herein provide enhancement over beamformed results by taking advantage of movement of an array acoustic sensors as the tool moves during dynamic logging and combining these overlapping images to form a stitched image along the depth that helps to distinguish the leak source generated acoustics against the background acoustics. The results using this feature included in FIGS. 3 and 4 demonstrate the resultant improvement thus increasing the accuracy of radial as well as depth localization of leaks. Radial location estimation of a leak by a leak detection tool, can be enhance by these techniques that improve the accuracy of this radial distance estimate and in a way vertical depth as well. With more accurate radial location, the leak detection tool can enable correct identification of which casing annuli the detected leak is located.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

The invention claimed is:

1. A method comprising:
   acquiring a sequence of beamformed images generated from signals captured by a tool as it moves over a range of depths of a wellbore, each beamformed image overlapping at least one other beamformed image of the sequence;
   processing the beamformed images, wherein processing the beamformed images comprises,
   normalizing each beamformed image in the sequence;
   applying a mask filter to each normalized beamformed image of the sequence; and
   multiplying each outcome of applying the mask filter by a gain, forming a product for each pair of outcome and gain; and
   combining the processed beamformed images with respect to depth to form a stitched image, wherein combining the processed beamformed images comprises combining representations of each product of outcome and gain.

2. The method of claim 1, wherein combining representations of each product includes directly combining each product.

3. The method of claim 1,
   wherein the representations of each product are results of multiplying each product by a weighting gain, and
   wherein the method includes generating the weighting gain from a frequency analysis of the signals captured by the tool.

4. The method of claim 1, wherein multiplying each outcome of applying the mask filter by a gain includes multiplying each outcome by an average power of the signals captured by the tool.

5. The method of claim 1, wherein applying the mask filter includes generating the mask filter based on a Cramer-Rao Lower Bound at a location (r, z) where z is depth and r is range.

6. The method of claim 5, wherein the Cramer-Rao Lower Bound at location (r, z) is computed by an inverse of a Fisher Matrix based on the tool having a number of sensors and on partial derivatives of each sensor response at location (r, z) with respect to r and z.

7. A machine-readable storage device having instructions stored thereon, which, when executed by one or more processors of a machine, cause the machine to perform operations, the operations comprising:
acquiring a sequence of beamformed images generated from signals captured by a tool as it moves over a range of depths of a wellbore, each beamformed image overlapping at least one other beamformed image of the sequence;
processing the beamformed images, wherein processing the beamformed images comprises,
normalizing each beamformed image in the sequence;
applying a mask filter to each normalized beamformed image of the sequence; and
multiplying each outcome of applying the mask filter by a gain, forming a product for each pair of outcome and gain; and
combining the processed beamformed images with respect to depth to form a stitched image, wherein combining the processed beamformed images comprises combining representations of each product of outcome and gain.

8. The machine-readable storage device of claim 7,
wherein the representations of each product are results of multiplying each product by a weighting gain, and
wherein the operations include generating the weighting gain from a frequency analysis of the signals captured by the tool.

9. The machine-readable storage device of claim 7, wherein multiplying each outcome of applying the mask filter by a gain includes multiplying each outcome by an average power of the signals captured by the tool.

10. The machine-readable storage device of claim 7, wherein applying the mask filter includes generating the mask filter based on a Cramer-Rao Lower Bound at a location (r, z) where z is depth and r is range.

11. The machine-readable storage device of claim 10, wherein the Cramer-Rao Lower Bound at location (r, z) is computed by an inverse of a Fisher Matrix based on the tool having a number of acoustic sensors and on partial derivatives of each sensor response at location (r, z) with respect to r and z.

12. A system comprising:
a tool having one or more acoustic sensors operable in a wellbore;
a processor arranged to:
acquire a sequence of beamformed images generated from signals captured by the tool over a range of depths of the wellbore, each beamformed image overlapping at least one other beamformed image of the sequence;
process the beamformed images, wherein the processor arranged to process the beamformed images comprises the processor arranged to,
normalize each beamformed image in the sequence;
apply a mask filter to each normalized beamformed image of the sequence; and
multiply each outcome of applying the mask filter by a gain, forming a product for each pair of outcome and gain; and
combine the processed beamformed images with respect to depth to form a stitched image, wherein the processor arranged to combine the processed beamformed images comprises the processor arranged to combine representations of each product of outcome and gain.

13. The system of claim 5, wherein the combination of the representations of each product is a direct combination of each product.

14. The system of claim 5,
wherein the representations of each product are results of multiplication of each product by a weighting gain; and
wherein the processor is to arrange to generate the weighting gain from a frequency analysis of the signals captured by the tool.

15. The system of claim 5, wherein the processor arranged to multiply each outcome of application of the mask filter by a gain includes the processor arranged to multiply each outcome by an average power of the signals captured by the tool.

16. The system of claim 12, wherein application of the mask filter includes generation of the mask filter based on a Cramer-Rao Lower Bound at a location (r, z) where z is depth and r is range.

17. The system of claim 16, wherein the Cramer-Rao Lower Bound at location (r, z) is a result of computation by an inverse of a Fisher Matrix based on a number of acoustic sensors of the tool and on partial derivatives of each acoustic sensor response at location (r, z) with respect to r and z.

* * * * *